(12) United States Patent
Martin

(10) Patent No.: US 6,723,193 B2
(45) Date of Patent: Apr. 20, 2004

(54) FRICTION BODY OF SILICON-INFILTRATED, CARBON FIBER-REINFORCED POROUS CARBON AND METHOD FOR MAKING SAME

(75) Inventor: Roland Martin, Aalen (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 38 days.

(21) Appl. No.: 09/998,128

(22) Filed: Dec. 3, 2001

(65) Prior Publication Data

US 2002/0068164 A1 Jun. 6, 2002

(30) Foreign Application Priority Data

Dec. 1, 2000 (DE) .......................................... 100 60 566

(51) Int. Cl.[7] .............................................. C04B 35/80
(52) U.S. Cl. .................... 156/89.26; 156/245; 29/29.1; 29/29.2; 29/640; 29/682
(58) Field of Search ................. 156/89.25, 89.26, 156/245; 264/29.1, 29.2, 29.3, 29.4, 29.5, 29.6, 29.7, 682, 657, 658, 640

(56) References Cited

U.S. PATENT DOCUMENTS

| | | | | |
|---|---|---|---|---|
| 4,514,240 A | * | 4/1985 | Heraud ..................... | 156/89.25 |
| 5,242,746 A | * | 9/1993 | Bommier et al. ........... | 442/247 |
| 5,942,064 A | * | 8/1999 | Krenkel et al. ............ | 156/89.26 |
| 6,042,935 A | * | 3/2000 | Krenkel et al. ........... | 428/307.7 |
| 6,079,525 A | * | 6/2000 | Dietrich et al. ......... | 188/251 A |
| 6,086,814 A | * | 7/2000 | Krenkel et al. ............. | 264/610 |
| 6,193,027 B1 | * | 2/2001 | Krenkel et al. ......... | 188/218 X |
| 6,261,981 B1 | * | 7/2001 | Dietrich et al. ............ | 501/95.2 |
| 6,328,834 B1 | * | 12/2001 | Rebstock et al. ........ | 156/89.26 |
| 6,517,756 B1 | * | 2/2003 | Rebstock ..................... | 264/108 |
| 6,531,011 B2 | * | 3/2003 | Gross et al. ............. | 156/89.25 |
| 2002/0029944 A1 | * | 3/2002 | Krenkel et al. ......... | 188/251 A |
| 2003/0003286 A1 | * | 1/2003 | Gruber et al. ........... | 428/293.4 |

FOREIGN PATENT DOCUMENTS

| | | |
|---|---|---|
| DE | 44 38 455 | 5/1996 |
| DE | 4438456 | 5/1996 |
| DE | 44 38 456 | 5/1996 |
| DE | 19721473 | 12/1998 |
| DE | 197 21 473 | 12/1998 |
| DE | 198 05 868 | 10/1999 |
| DE | 19805868 | 10/1999 |
| DE | 19834704 | 2/2000 |
| DE | 198 34 704 | 2/2000 |
| DE | 199 01 215 | 7/2000 |
| DE | 19901215 | 7/2000 |
| EP | 0 797 555 | 10/1995 |
| EP | 1 124 074 | * 8/2001 |
| GB | 1 457 757 | * 12/1976 |
| WO | 99/41069 | * 8/1999 |
| WO | WO 99/41069 | 8/1999 |
| WO | 00/41982 | * 7/2000 |

* cited by examiner

*Primary Examiner*—Curtis Mayes
(74) *Attorney, Agent, or Firm*—Crowell & Moring LLP

(57) ABSTRACT

A friction body of porous carbon, which is infiltrated with silicon and reinforced with carbon fibers, includes at least one separate friction layer on a core body. In order to protect the friction layer against damage by outbreaking, carbon fibers in the friction layer are shorter than carbon fibers of the core body. Accordingly, different possibilities for producing a friction body with short fibers in the friction layer are possible.

9 Claims, 5 Drawing Sheets

FRICTION BODY OF SILICON-INFILTRATED, CARBON FIBER-REINFORCED POROUS CARBON AND METHOD FOR MAKING SAME

This application claims the priority of German patent document 100 60 566.4, filed Dec. 1, 2000, the disclosure of which is expressly incorporated by reference herein.

BACKGROUND AND SUMMARY OF INVENTION

The present invention relates to a friction body of silicon-infiltrated, carbon fiber-reinforced porous carbon, a method for the manufacture of such a friction body, and a use of such a friction body.

Friction bodies of carbon fiber-reinforced silicon carbide are known, for example, from DE 44 38 455 C1 (U.S. Pat. No. 6,086,814).

EP 0 797 555 A1 (U.S. Pat. No. 6,042,935) discloses a friction unit, which consists of a core body and at least one friction layer. For this unit, the friction layer is to be produced initially as a carbon body, which is then infiltrated with silicon. Between the friction layer and the core body, a connecting layer is disposed, which contains essentially silicon carbide. The friction layer and the core body are produced separately and are then connected with one another. In the case of an internally vented brake disk, the core body may, for example, also be constructed in two parts, with the cooling channels being formed in the connecting plane. There are two proposed methods for connecting the friction layer and the core body. The friction layer and core body either (1) are produced from a carbon material, assembled and infiltrated jointly with silicon, or (2) are infiltrated separately with silicon and subsequently connected to one another, in that silicon or preferably silicon carbide is brought into the plane separating the friction layer and the core body. With regard to the composition of the friction layer, it is disclosed that this is to be optimized with regard to its frictional behavior. For this purpose, it is proposed that additives, which increase or decrease the friction, be used. Boron nitride or aluminum phosphate decreases friction. On the other hand, silicon carbide powder with a particle size of 0.3 to 3.0 $\mu$m increases friction. In addition, carbon fibers may be provided in order to increase thermal conductivity. The proportion of fibers in the thickness direction should be 3% to 10%. An optimization of the strength of the friction layer is not disclosed.

Compared to this state of the art, the problem arises of protecting the friction layer against damage by outbreaking.

This problem is solved according to preferred embodiments of the present invention. It is proposed that carbon fibers, which are shorter than the carbon fibers of the core body, be provided in the friction layer.

The present invention is based on the realization that fiber lengths, which are necessary for strength reasons in the area of the core body, lead to extensive outbreaking in the friction layer. The reason for this lies in that a particle, that breaks out of the surface of the friction layer tends to pull out surrounding areas over the carbon fibers, which are tied in. On the other hand, if the friction layer consists of a pure ceramic and carbon fibers are not provided in the friction layer, outbreaking also occurs over a large surface, since the necessary strength of the friction layer is missing here. With the shorter carbon fibers, provided pursuant to the present invention, a high strength of the friction layer is achieved in an advantageous manner. Outbreaking is limited to small areas since, because of the decreased length of the carbon fibers, a region of the friction surface that is outbreaking can tear out only a small surrounding region.

In accordance with an advantageous embodiment of a device according to the present invention, the length of the carbon fibers in the friction layer is less than 50% of the length of the carbon fibers in the core body. A length of 1 mm to 5 mm for the carbon fibers in the friction layer has proven to be advantageous.

Pursuant to a method according to the present invention, different possibilities for producing a friction body with short fibers in the friction layer are proposed.

According to a first alternative, the green compacts for the friction layer and the core body are produced separately, glued together and subsequently pyrolyzed and infiltrated with silicon. According to a second alternative, the friction layer is introduced during the original shaping of the core body, in which a green compact for the friction layer is placed into the original mold for the core body and subsequently the material for the core body is filled into the original mold. The further production of the friction body then takes place in a known manner. The special advantage of this alternative lies in that no additional binder is required between the friction layer and the core body.

According to a third alternative, initially the material for the friction layer and, subsequently, the material for the core body are enveloped in the original mold for the core body. Depending on the development of the process, the material for the friction layer can also be pre-consolidated after it is filled into the mold. The further production of the friction body then takes place in a known manner. The special advantage of this method lies in that a molding process is no longer required for the friction layer, because the friction layer is produced together with the core body. Moreover, in the case of a brake disk produced in this manner, a break between the friction layer and the core body is no longer visible.

It is particularly advantageous to use such a friction body or a friction body produced in this manner in highly stressed vehicle parts, especially as a brake disk, as a friction lining or as a clutch plate. The use in conjunction with a two-part core body, such as an internally vented core body, can be carried out particularly easily with the above method, but is not a prerequisite for implementing the method shown.

Other objects, advantages and novel features of the present invention will become apparent from the following detailed description of the present invention when considered in conjunction with the accompanying drawings.

DETAILED DESCRIPTION OF THE DRAWINGS

Figure 1:
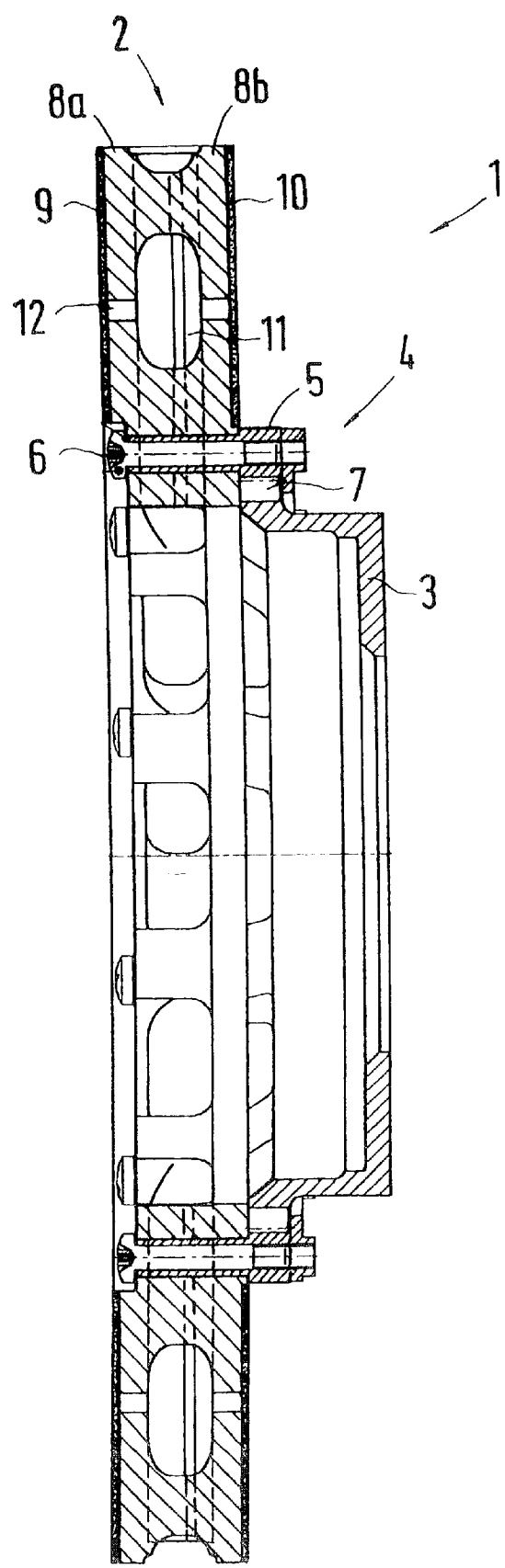
FIG. 1 shows a main section through a brake disk according to the present invention.

The brake disk 1, shown in FIG. 1, consists of a friction body: friction ring 2 and a pot 3. Connecting elements 4, which in each case consist of a sleeve 5 and a screw 6, are provided for connecting the friction ring 2 with the pot 3. The sleeves 5 are guided at the foot in slots 7, which are provided on the outside of the pot 3 and extend in a radial direction. The sleeves 5 pass through the friction ring 2 completely, so that the screws 6 serve only to secure the friction ring 2 in the axial direction.

The friction ring 2 consists of a core body 8 and friction layers 9, 10, which are disposed on the outside. The core body 8 is built up from two halves 8a and 8b and has air channels 11, which are provided between the halves 8a and 8b. Boreholes 12 are disposed in the friction ring 2 in an axial direction and pass through the core body 8 as well as the friction layers 9, 10.

The core body 8 consists of silicon carbide, reinforced with carbon fibers. The length of the carbon fibers in the core body 8 ranges from 5 to 9 mm. The friction layers 9, 10 are built up from a similar material, the length of the carbon fibers ranging from 1 to 5 mm and preferably are 1 mm.

Figure 2:
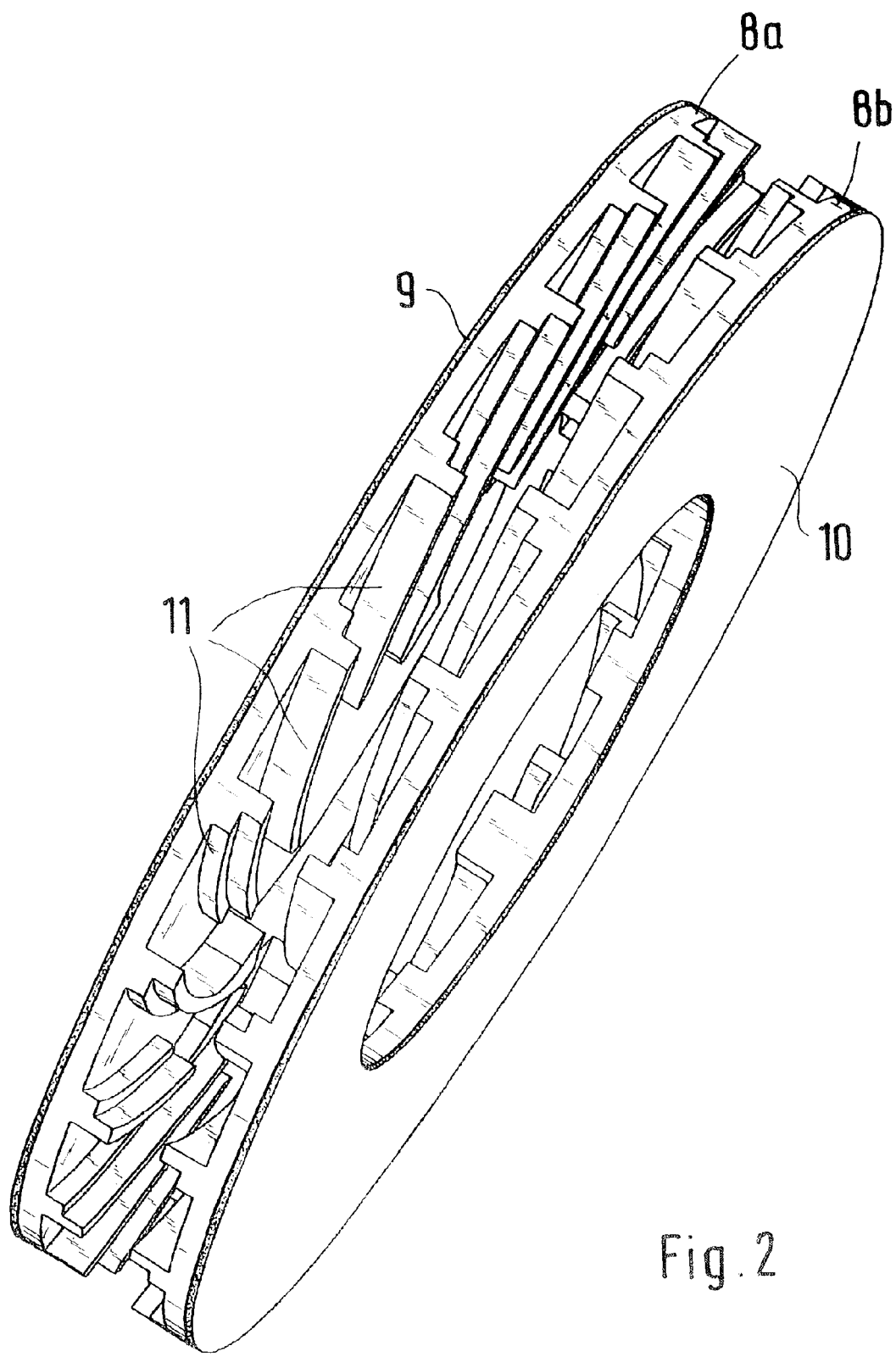
FIG. 2 shows an inclined view in an exploded representation.

In FIG. 2, the halves 8a, 8b of the core body are shown in an exploded representation. The air channels 11, which are constructed involute-shaped and incorporated in each case semi-laterally in the halves 8a, 8b of the core body, can be seen well. The boreholes 12 are not shown here. The friction layers 9, 10 cover both faces of the friction ring 2. The surface areas interact with a friction-producing counterbody, such as a brake lining. The thickness (d) of the friction layers 9, 10 is between 1 and 4 mm.

The following three variations are described for producing such a friction ring 2.

Figure 3:
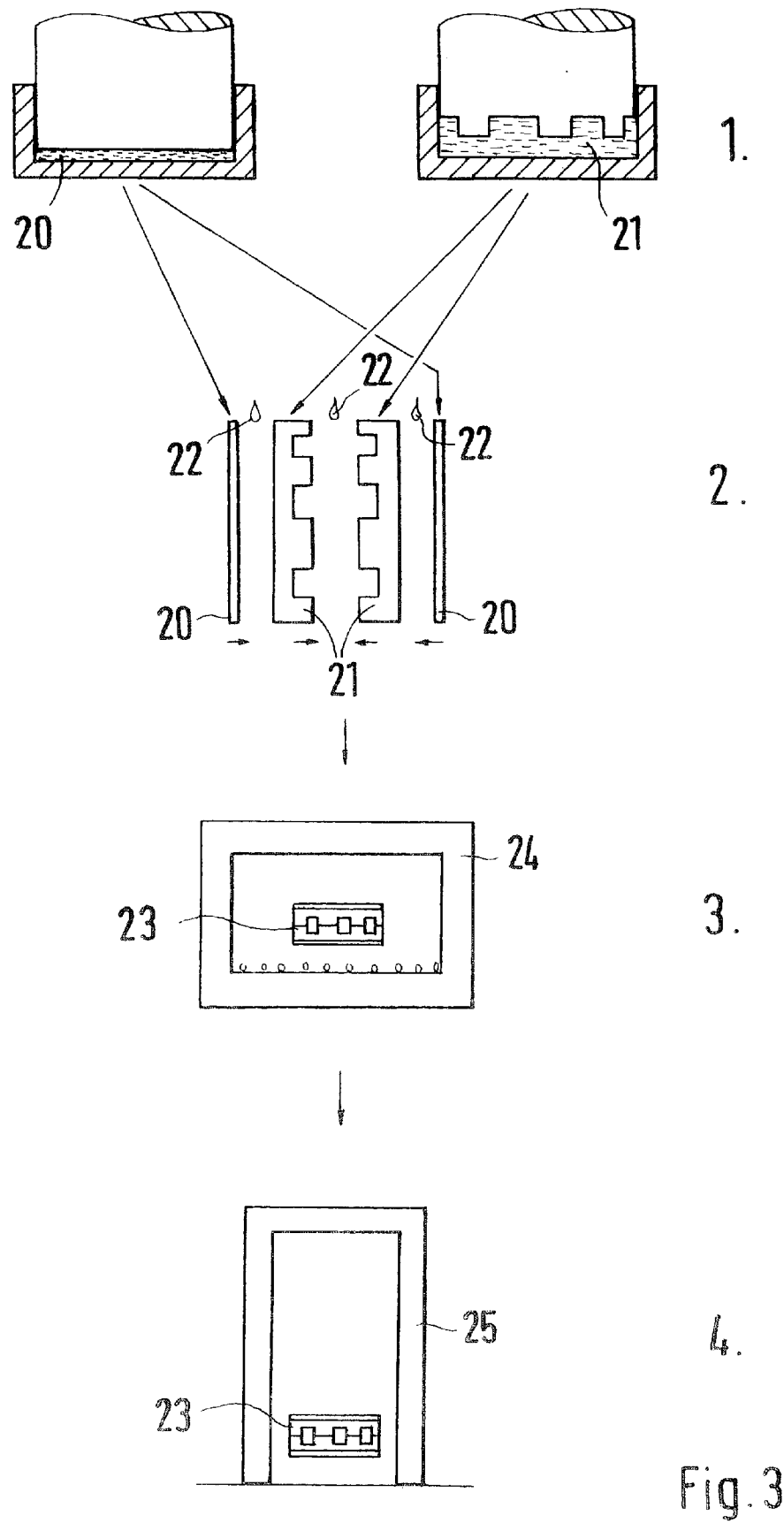
FIG. 3 shows a representation of a first manufacturing method according to the present invention.

According to the first variation, shown in FIG. 3, green compacts 20 for the friction layers 9, 10 and green compacts 21 for the halves 8a, 8b of the core body are produced independently from one another in a first step. Subsequently, in a second step, the green compacts are joined together with the help of a graphite adhesive 22 to form a green compact 23 for the core body 8. Likewise, in a second step, the green compacts 20 are mounted on the green compact 23 for the core body by a carbon-containing adhesive, such as a graphite adhesive 22.

The green compact 23 for the friction ring 2, formed in this manner, is subsequently pyrolyzed in a third step in a known manner in a furnace 24 and finally infiltrated with silicon in a fourth step in a further furnace 25. The friction ring 2, which is obtained in this manner, is subsequently subjected to fine machining.

Figure 4:
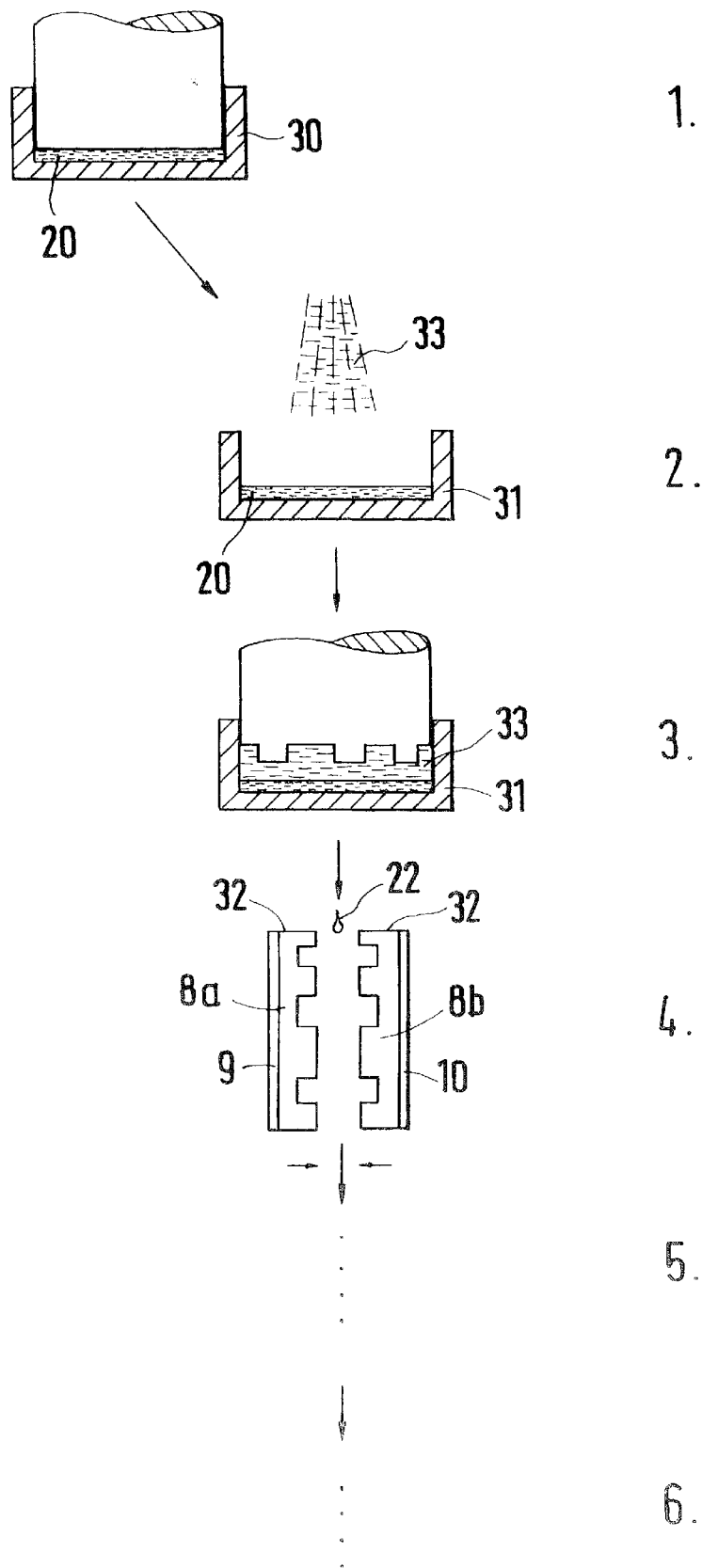
FIG. 4 shows a representation of a second manufacturing method according to the present invention.

FIG. 4 shows a second variation for producing the friction ring 2. In a first step, green compacts 20 for the friction layers 9, 10 are produced in a first mold 30. In each case, one of these green compacts 20 is inserted in a second step into a mold 31 for producing green compacts 32 for the halves 8a, 8b of the core body. The material 33 for the core body 8 is filled into this mold 31 in a second step and molded in a third step with the help of a mold ram. In this way, green compacts 32 are obtained, which already represent a one-piece composite of, in each case, one of the halves 8a, 8b of the core body and one of the friction layers 9, 10. In a fourth step, the green compacts 32 are combined with one another by a graphite adhesive 22 to form a green compact 23 for the friction ring 2, which finally, in a fifth and sixth step, is pyrolyzed in furnace 23 and infiltrated with silicon in furnace 24, as already presented in steps three and four of the first variation.

Figure 5:
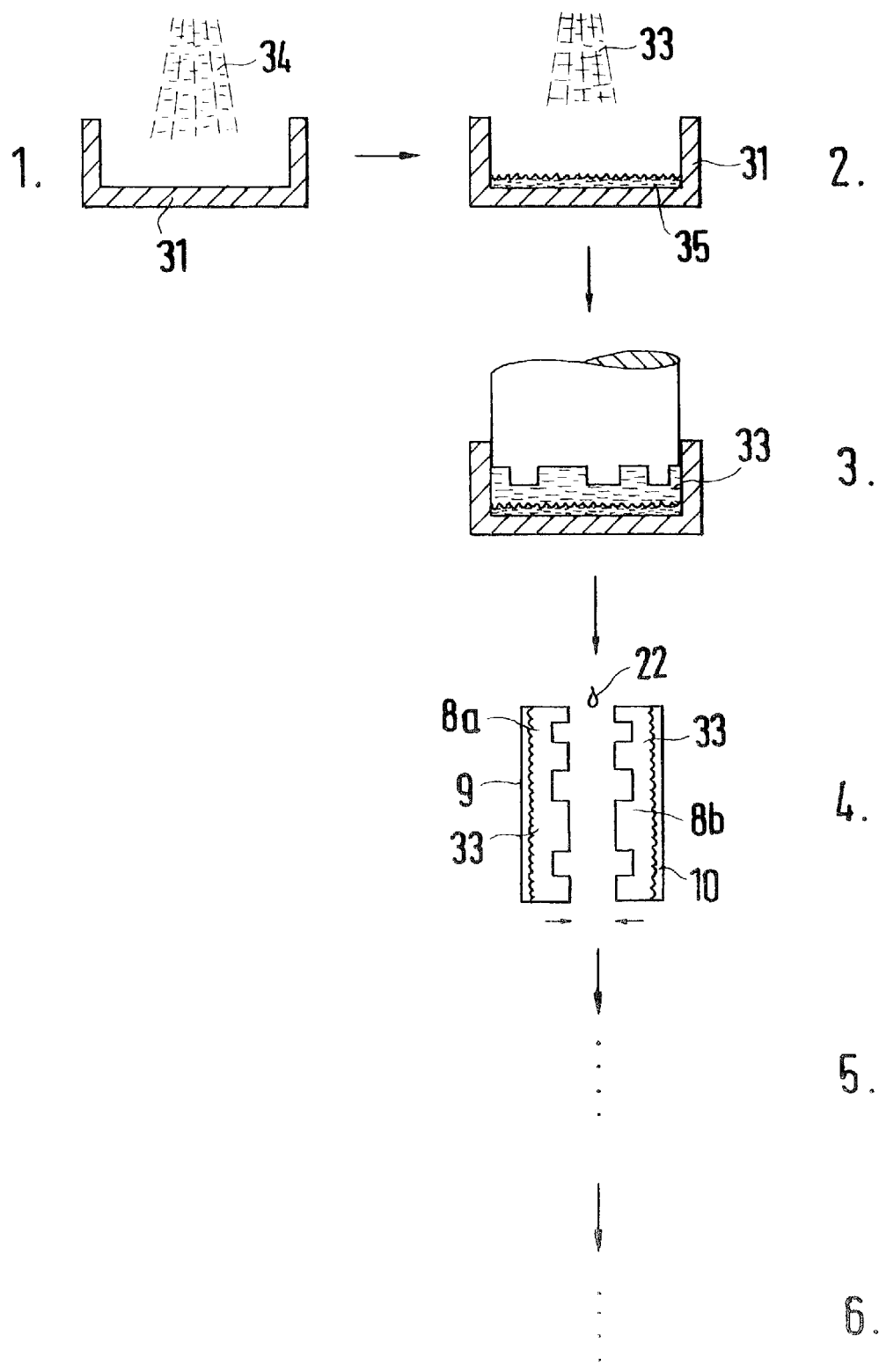
FIG. 5 shows a representation of a third manufacturing method according to the present invention.

FIG. 5 shows a third variation of the manufacturing process. In a first step, raw material 34 for the friction layers 9, 10, is filled into a mold 31 for the halves 8a, 8b of the core body, forming a layer 35 in the mold 31. The material 33 for the core body 8 is filled onto this layer 35 in a second step and subsequently compressed in a third step to green compacts 32 for the halves 8a, 8b of the core body. In a fourth step, the green compacts 32 are joined together with a graphite adhesive 22 into a green compact 23 for the friction ring 2, which is finally, in the fifth and sixth steps, pyrolyzed in the furnace 23 and infiltrated with silicon in the furnace 24, as already presented in steps three and four of the first variation.

In a modification of the method of the third variation, it is also possible to compress the layer 35 after the first step and, in this way, achieve a pre-consolidation.

Even though the core body 8 is always constructed in two parts above, it should be pointed out that all the devices and steps of the method, which are shown above, can also be used with a one-part core body 8, in which case the steps of the method would have to be modified correspondingly.

Although particular embodiments of the present invention has been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A method for producing a friction body, comprising:

producing a green compact for at least one friction layer;

inserting the green compact for the at least one friction layer into an original mold for a core body;

filling a material for the core body into the original mold;

producing a green compact for the friction body;

pyrolyzing the green compact for the friction body; and infiltrating silicon into the pyrolyzed green compact for the friction body.

2. The method of claim 1, wherein said core body includes porous carbon and is infiltrated with silicon and reinforced with carbon fibers; and said friction layer contains carbon fibers having a length that is less than the length of the carbon fibers in the core body.

3. The method of claim 2, wherein the length of the carbon fibers in the friction layer is less than 50% of the length of the carbon fibers in the core body.

4. The method of claim 2, wherein the length of the carbon fibers in the friction layer ranges from 1 to 5 mm.

5. The method of claim 1, wherein said green compact for said at least one friction layer is produced in a first mold, said first mold being different from said original mold.

6. A method of using a friction body produced in accordance with claim 1, said method comprising:

installing the friction body produced in accordance with claim 1 in a vehicle.

7. A method of using a friction body according to claim 6, wherein the friction body is a component of at least one of a friction lining, a brake disc, or a clutch plate.

8. A method for producing a disc brake assembly, comprising:

a) producing a green compact for a first friction layer;

b) inserting the green compact for the first friction layer into an original mold for a half of a core body;

c) filling a material for a first half of a core body into the original mold;

d) producing a first green compact of a half of a core body and a friction layer;

e) pyrolyzing the first green compact of a half of a core body and a friction layer; and f) infiltrating silicon into the pyrolyzed first green compact of a half of a core body and a friction layer.

9. The method of claim 8, comprising:

repeating steps a–d to produce a second green compact of a half of a core body and a friction layer and combining the first green compact of a half of a core body and a friction layer and the second green compact of a half of a core body and a friction layer to form a green compact far a friction ring, wherein
said step of pyrolyzing involves pyrolyzing the green compact for a friction ring, and
said step of infiltrating silicon involves infiltrating silicon into the pyrolyzed green compact for a friction ring.

* * * * *